United States Patent
Rodrigues et al.

(10) Patent No.: US 7,776,985 B2
(45) Date of Patent: Aug. 17, 2010

(54) GLASS ADHESION PROMOTER

(75) Inventors: Klin A. Rodrigues, Signal Mountain, TN (US); James C. Long, Chattanooga, TN (US)

(73) Assignee: Akzo Nobel N.V. (NL)

( * ) Notice: Subject to any disclaimer, the term of this patent is extended or adjusted under 35 U.S.C. 154(b) by 0 days.

(21) Appl. No.: 11/852,435

(22) Filed: Sep. 10, 2007

(65) Prior Publication Data

US 2008/0004416 A1  Jan. 3, 2008

Related U.S. Application Data

(62) Division of application No. 10/860,305, filed on Jun. 3, 2004, now Pat. No. 7,270,853.

(60) Provisional application No. 60/477,979, filed on Jun. 12, 2003.

(51) Int. Cl.
*C08F 20/06* (2006.01)

(52) U.S. Cl. .............. 526/317.1; 526/318.2; 526/303.1; 526/279

(58) Field of Classification Search .............. 526/317.1, 526/318.2, 303.1, 279
See application file for complete search history.

(56) References Cited

U.S. PATENT DOCUMENTS

| | | | |
|---|---|---|---|
| 3,560,589 A * | 2/1971 | Sato et al. ............... 525/116 |
| 3,966,687 A * | 6/1976 | Ribba ....................... 526/261 |
| 4,499,002 A | 2/1985 | Masler, III et al. |
| 4,861,499 A | 8/1989 | Neff et al. |
| 4,869,932 A | 9/1989 | Romberger |
| 5,318,990 A | 6/1994 | Strauss |
| 5,340,868 A | 8/1994 | Strauss et al. |
| 5,480,934 A | 1/1996 | Messner et al. |
| 5,661,213 A | 8/1997 | Arkens et al. |
| 5,670,585 A | 9/1997 | Taylor et al. |
| 5,763,524 A | 6/1998 | Arkens et al. |
| 5,932,665 A | 8/1999 | DePorter et al. |
| 5,932,689 A | 8/1999 | Arkens et al. |
| 5,977,232 A | 11/1999 | Arkens et al. |
| 5,981,691 A | 11/1999 | Sikes |
| 6,031,045 A | 2/2000 | Wei et al. |
| 6,136,916 A | 10/2000 | Arkens et al. |
| 6,194,512 B1 | 2/2001 | Chen et al. |
| 6,199,318 B1 | 3/2001 | Stewart et al. |
| 6,221,973 B1 | 4/2001 | Arkens et al. |
| 6,274,661 B1 | 8/2001 | Chen et al. |
| 6,331,350 B1 | 12/2001 | Taylor et al. |
| 6,372,842 B1 * | 4/2002 | Grisso et al. ............ 524/547 |
| 6,537,327 B2 | 3/2003 | Rodrigues |
| 2002/0072580 A1 | 6/2002 | Aert et al. |

FOREIGN PATENT DOCUMENTS

| | | |
|---|---|---|
| DE | 19950941 A1 | 4/2001 |
| EP | 0377188 A | 7/1990 |
| EP | 0990727 A1 | 4/2000 |
| EP | 0990728 A1 | 4/2000 |
| GB | 1079846 A | 8/1967 |
| GB | 1271500 A | 4/1972 |
| GB | 2146343 A | 4/1985 |
| JP | 55003313 | 1/1980 |
| JP | 6-271738 | 9/1994 |
| RO | 368049 A | 12/1994 |

OTHER PUBLICATIONS

Nikolaev et al., "Nonfogging coatings for a glass surface" Chemical Abstracts Services, Columbus, Ohio 1981:519763, XP002317262, Mar. 15, 1981.
Anonymous, "Coating or sizing composition for inorganic or organic substrates . . . ", Derwent Publications Ltd., London, GB, AN 1995-065021, XP002309047, Dec. 10, 1994.
English Translation of Japanese Publication No. 6-271738.
Partial European Search Report for Application No. 09178285; completion date Jun. 22, 2010.

* cited by examiner

*Primary Examiner*—Kuo-Liang Peng
(74) *Attorney, Agent, or Firm*—James C. Abruzzo; Louis A. Morris

(57) ABSTRACT

A glass adhesion composition containing a copolymer having an acid and a substituted amide, silanol, or amine oxide functionality. The substituted amide, silanol, or amine oxide functionality provide excellent adhesion of the copolymer to glass, silica, sand and other silicon-based substances. The copolymer is useful as a fiberglass binder, and also useful in providing protective coatings on glass sheets. A fiberglass sizing composition is also provided having a copolymer that includes at least one acid group derived from at least one acid monomer, a hydrophobic comonomer, and a crosslinker. Additives can be added to the compositions to provide other functionality such as corrosion inhibitors, hydrophobic additives, additives for reducing leaching of glass, release agents, acids for lowering pH, anti-oxidants/reducing agents, emulsifiers, dyes, pigments, oils, fillers, colorants, curing agents, anti-migration aids, biocides, plasticizers, waxes, anti-foaming agents, coupling agents, thermal stabilizers, flame retardants, enzymes, wetting agents, and lubricants.

7 Claims, No Drawings

GLASS ADHESION PROMOTER

CROSS REFERENCE TO RELATED APPLICATIONS

The present application is a divisional application of Ser. No. 10/860,305, filed Jun. 3, 2004 now U.S. Pat. No. 7,270,853, issued 18 Sep. 2007, which claims the benefit of U.S. Provisional Application No. 60/477,979 filed 12 Jun. 2003.

BACKGROUND OF THE INVENTION

The present invention is directed towards a glass adhesion promoter or composition. More specifically, the invention is directed towards a copolymer useful in a glass binding composition wherein the copolymer has a carboxyl-functional moiety and a substituted amide, silanol, or amine oxide functional moiety. The copolymer is useful both as a fiberglass binder and in providing protective coatings on glass sheets.

Fiberglass insulation products generally consist of glass fibers bound together by a polymeric binder. The fibers are bound by spraying an aqueous polymer binder onto matted glass fibers soon after the fibers are formed and while they are still hot. This polymeric binder accumulates at the junctions where the fibers cross each other, holding the fibers together at these points. The heat from the fibers vaporizes most of the water in the binder. The fiberglass binder should be flexible so that the fiberglass product can be compressed for packaging and shipping and later recover to its full vertical dimension when installed.

In the past, fiberglass applications employed phenol-formaldehyde resins in their binder systems. These phenol-formaldehyde compositions provided an excellent product with flexibility. However, due to environmental and safety concerns formaldehyde-free polymeric binder systems were developed as a substitute for the phenol-formaldehyde compositions. These formaldehyde-free binder systems typically involve three parts. One part is a polymer such as a polycarboxyl, polyacid, polyacrylic, or anhydride that can be copolymerized with other ethylenically unsaturated monomers. A second part is a cross-linker that is an active hydrogen compound, such as trihydric alcohol, triethanol amine, beta-hydroxy alkyl amides, or hydroxy alkyl urea. The system can also include a catalyst or accelerator, such as a phosphorous containing compound or a fluoroborate compound. Still, these carboxyl-containing polymers and co-polymers show poor adhesion to glass fibers, resulting in insulation that sags over time.

Accordingly, there is a need for alternative fiberglass binder systems that provide the performance advantages of phenol-formaldehyde resins in a formaldehyde-free system. Further, there is a need for a fiberglass binder composition having good adhesion to glass fibers.

It is known to use a phosphorus-based catalyst for fiberglass sizing formulations. While the phosphorus-based catalysts lower the curing temperature, the addition of inorganic salts such as sodium hypophosphite adversely affect the water uptake of the finished product. While not being bound by theory, the inorganic salts introduced in to the insulation system tend to absorb moisture by a capillary mechanism. Accordingly, there is a need to minimize or even eliminate the inorganic salts (electrolytes) in this system. Additionally, there is a need for a fiberglass binder system and its associated resin(s) having improved water and humidity resistance, and that are not subject to the water absorption problems described above.

SUMMARY OF THE INVENTION

It has now been found that excellent adhesion to glass can be obtained by the copolymerization of a substituted amide, silanol, or amine oxide functional-monomer with a carboxyl-functional monomer. This copolymer also provides good adhesion to silicon-based materials such as glass sheets, thereby providing a protective coating to the glass.

In one aspect the present invention is directed towards a copolymer composition having one or more acid functional monomer units in an amount of about 30 to about 99.99 percent by weight; monomer units selected from the group consisting of substituted amide monomers, silanol monomers, or amine oxide monomers in an amount of about 0.01 to about 30 percent by weight; and one or more other ethylenically unsaturated monomer units in an amount of about 0 to about 50 percent by weight, with the sum of all monomer weight percentages that make up the copolymer binder composition adding up to 100 percent.

The invention is also directed to a silicon-based substrate having directly deposited thereon this copolymer binder composition.

In another aspect, the present invention is directed towards a fiberglass binding or sizing composition or formulation. This fiberglass binding composition includes a polymer or copolymer having at least one acid group, at least one carboxylic comonomer and at least one crosslinker.

In another aspect, the fiberglass binding composition includes a copolymer having at least one acid group derived from at least one acid monomer having the general formula (I)—

wherein $R^1$ to $R^4$ are independently hydrogen, methyl, carboxylic acid group or $CH_2COOH$, alkyl or aryl sulfonic acid and wherein the acid groups can be neutralized.

This fiberglass binding composition further includes a hydrophobic comonomer having the general formula (II)—

wherein $R^5$ is hydrogen, $C_1$-$C_6$ alkyl or $C_1$-$C_6$ hydroxyalkyl, and X is either mono or polycyclic aromatic group or a substituted aromatic group (with $R^5$ being hydrogen or methyl when X is aromatic) or X is of the general formula (III)—

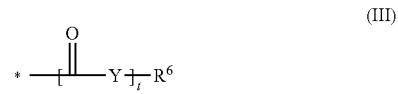

wherein $R^6$ is (independently of $R^5$) hydrogen, $C_1$-$C_{24}$ alkyl, $C_1$-$C_{24}$ alkoxy, $C_1$-$C_{24}$ aminoalkyl, $C_1$-$C_{24}$ alkyl sulfonate, —O alkyl, —OCO alkyl, —NCO alkyl, carbocyclic, heterocyclic, or $C_1$-$C_{24}$ hydroxyalkyl; Y is O or N; and t is either 0 or 1. The fiberglass binding composition also includes a crosslinker.

It has now been found that addition of small amounts of hydrophobic functionality can overcome water absorption problems of fiberglass sizing formulations containing inorganic salts. In this respect, the invention is directed towards a resin containing hydrophobically functional comonomer. This hydrophobic functionality can be introduced into the copolymer by the addition of hydrophobic comonomers. Alternatively, the hydrophobic functionality can be introduced by adding hydrophobic emulsions as an additive. In another aspect, surfactants are beneficial to these formulations either as the hydrophobic additive or as a stabilizer for the hydrophobic emulsion additives. Alternatively, these hydrophobic emulsion additives can be stabilized by colloid stabilizers.

The present invention is further directed towards an aqueous process for producing hydrophobic solution copolymers. This process includes adding an acid functional monomer and a hydrophobic monomer to an aqueous solution. An initiating agent is added to the solution to effect polymerization of the monomers. The monomers are then polymerized, thereby forming hydrophobic solution copolymers in the aqueous solution.

DETAILED DESCRIPTION OF THE INVENTION

The present invention relates to a glass adhesion copolymer useful in a fiberglass binder composition and having excellent adhesion to glass and other silicon-based substrates. The glass adhesion copolymer is formed by copolymerization of one or more acid functional monomers with one or more ethylenically unsaturated monomers. These unsaturated monomers include substituted amide, silanol, or amine oxide functional-monomer. In one aspect, the glass adhesion copolymer includes di-substituted amide monomer units.

In one aspect, the one or more acid monomers is at least a carboxylic acid monomer used in synthesizing the binder make up from about 30 to about 99.99 mole percent of the copolymer. In another aspect, the one or more acid monomers make up from about 50 to about 99 mole percent. In anther aspect, the one or more acid monomers make up from about 60 to about 95 mole percent of the copolymer.

The carboxylic acid monomer includes anhydrides that can form carboxyl groups in situ. Examples of carboxylic acid monomers useful in forming the copolymer of the invention include acrylic acid, methacrylic acid, crotonic acid, isocrotonic acid, fumaric acid, maleic acid, cinnanic acid, 2-methylmaleic acid, itaconic acid, 2-methylitaconic acid, sorbic acid, α-β-methylene glutaric acid, maleic anhydride, itaconic anhydride, acrylic anhydride, methacrylic anhydride. In one embodiment the monomers are maleic acid, acrylic acid and/or methacrylic acid. The carboxyl groups can also be formed in situ, such as in the case of isopropyl esters of acrylates and methacrylates that form acids by hydrolysis of the esters when the isopropyl group leaves. The acid monomer can include a sulfonic acid group such as 2-acrylamidomethyl propane sulfonic acid, styrene sulfonic acid, (meth)allyl sulfonic acid and (meth)allyloxybenzene sulfonic acid. Mixtures of carboxylic acids and sulfonic acids can also be used.

The glass adhesion copolymer is synthesized from one or more substituted amide, silanol, or amine oxide-functional monomers. These functional monomers are used at a level of from 0.01 to 30 percent by weight, based on the total monomer. In another aspect they are used at a level of from 0.1 to 5 percent by weight. Substituted amide monomers include those having the formula (IV):

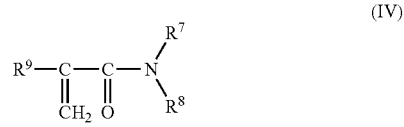

wherein $R^7$ and $R^8$ are independently H, OH, $C_{1-30}$, alkyl, aryl, alkyl aryl or hydroxyalkyl; and $R^9$ is H or $CH_3$.

Examples of substituted amide monomers include N-methylol acrylamide, N-ethanol acrylamide, N-propanol acrylamide, N-methylol methacrylamide, N,N-dimethylacrylamide, N,N-diethyl acrylamide, N-isopropyl acrylamide, N-hydroxyethyl acrylamide, N-hydroxypropylacrylamide, N-octylacrylamide, N-laurylacrylamide, dimethyl aminopropyl (meth)acrylamide, and 1-vinyl-2-pyrrolidinone. In one aspect the substituted amide is a di-substituted amide such as N,N-dimethylacrylamide, and N,N-diethylacrylamide. The substituted amide monomer useful in the invention can also be a ring opening monomer with the substituted amide in the backbone of the monomer, wherein the monomer will copolymerize by condensation or ring opening polymerization.

Examples of silanol monomers include vinyl trisisopropoxy silane, vinyl trisethoxy silane, vinyl trismethoxy silane, vinyl tri(2-methoxyethoxy) silane, vinyl methyl dimethoxy silane, γ-methacryl oxypropyl trimethoxy silane, and vinyl triacetoxy silane. These monomers are typically copolymerized with acrylic acid in water. They hydrolyze in situ forming silanol linkages and liberating the corresponding alcohol, which can then be distilled off.

In one embodiment, the amine oxide monomers are incorporated by copolymerizing a amine-containing monomer such as 2-vinylpyridine, 4-vinyl pyridine, or dimethyl aminoethyl methacrylate and subsequently oxidizing the amine functionality to the amine oxide. In another embodiment, the amine is oxidized to amine oxide prior to polymerization, and the monomer is then incorporated into the polymer.

The substituted amide and silanol functionalities can be introduced to the polymer by other means. For example, the silanol functionality can be incorporated by using a chain transfer agent such as γ-mercaptopropyl trimethoxysilane. Also, a polymer containing acryl amide groups can be functionalized with dimethyl amine or another amine to give a substituted amide derivative. Copolymers of amino acids such as a copolymer of aspartic acid and sodium aspartate as disclosed in U.S. Pat. No. 5,981,691 are useful. These polymers contain amide functionality in the backbone (available as Reactin AS 11 from Folia, Inc., Birmingham, Ala.). These copolymers also have imide functionality. This imide functionality can be reacted with an amine reagent such as diethanol amine to form a polymer with amide side chains. Copolymers from condensation and ring opening polymerization can also be used. An example of this is poly(2-ethyl-2-oxazoline), wherein the substituted amide is in the backbone of the polymer.

Other ethylenically unsaturated monomers added at levels of up to about 50 weight percent based on total monomers can also be optionally used to form the glass adhesion copolymer. These monomers can be used to obtain desirable properties of the copolymer in ways known in the art. Monomers can also be use to adjust the glass transition temperature ('$T_g$') of the copolymer to meet end-use application requirements. Examples of useful monomers include (meth)acrylates, maleates, (meth)acrylamides, vinyl esters, itaconates, styrenics, acrylonitrile, nitrogen functional monomers, vinyl esters, alcohol functional monomers, and unsaturated hydrocarbons.

Low levels of up to a few percent of crosslinking monomers can optionally be used to form the glass adhesion copolymer. The extra crosslinking improves the strength of the bonding; however, higher levels can be detrimental to the flexibility of the resultant material. The crosslinking moieties can be latent crosslinking where the crosslinking reaction takes place not during polymerization but during curing of the binder. Chain-transfer agents known in the art can also be used to regulate chain length and molecular weight. The chain transfer agents can be multifunctional so that star type polymers can be produced. The crosslinker can be a polyol and/or a polyamine.

The copolymer is synthesized by known polymerization methods. These include solution, emulsion, suspension and inverse emulsion polymerization methods. In one aspect, the polymer is formed by solution polymerization in an aqueous medium. The aqueous medium can be water or a mixed water/water-miscible solvent system such as a water/alcohol solution. The polymerization can be batch, semi-batch, or continuous. The polymers are typically prepared by free radical polymerization; however, condensation polymerization can also be used to produce a polymer containing the desired moieties. The monomers can be added to the initial charge, added on a delayed basis, or a combination of the two. Accordingly, the present invention includes an aqueous solution having the copolymer therein. In another aspect, this aqueous solution further includes a silanol moiety.

The architecture of the glass adhesion copolymer can be random, block, star, or other known polymer architecture. Random polymers are preferred due to the economic advantages; however, other architectures could be useful in certain end uses. In one aspect, the copolymers typically have weight-averaged molecular weights in the range of about 1,000 to about 300,000. In another aspect, the copolymers have weight-averaged molecular weights in the range of about 2,000 to about 15,000. In one aspect, the molecular weight of the copolymer is in the range of about 2,500 to about 10,000. In another aspect, the molecular weight of the copolymer is in the range of about 3,000 to about 6,000.

As previously noted, the copolymer binder exhibits very good adhesion to silicon-based substrates. As used herein, silicon-based substrates refer to any substrate containing silicon atoms. Silicon-based substrates include glass in the form of sheets, fibers, beads, and formed objects; silicas, silicates, sand, clays and silicon microchip materials. If SiOH or silanol groups are present on the substrate, the copolymers of the invention adhere to the substrate. Accordingly, the present invention includes a silicon-based substrate having deposited thereon the copolymer binder composition. When the substrate is glass fibers, the copolymer binder composition is provided at a level effective in binding the fibers together, thereby forming a self-sustaining web.

In addition to its use as a fiberglass binder, particularly useful end uses of the copolymer include forming glass-protective coatings. Other uses include binders in cements and other building materials where sand is used as filler. The composition's bonding with the sand leads to improved composite strength. The composition can also be used in adhering materials to silicon microchips or in adhering silicon microchips to other substrates. The copolymer can partially or completely cover one or more sides of the silicon-based substrate, or it can contact the substrate in one or more discrete points of contact.

Another end use of the glass adhesion copolymer is in fiberglass reinforced composites. Fiberglass is used as a reinforcement material in plastics, wall boards and other such material. However, the fiberglass often is not compatible in the plastic or gypsum that it is added to. The glass adhesion copolymer of this invention aids in making the fiberglass compatible for use in the plastic or other substrates. In this manner, at least part of the copolymer adheres to the fiberglass while at least another part of the copolymer anchors in the plastic or gypsum substrate. Accordingly, fiberglass that has been treated with the glass adhesion copolymer of the present invention enhances the physical properties of composite materials such as plastic, gypsum concrete, wood and/or cloth when they are formed using this fiberglass.

In addition to the glass adhesion copolymer, the fiberglass binder composition can include a crosslinker. The sizing composition can be formulated with a crosslinker typically used in fiberglass binder compositions, such as hydroxyl, polyol, or polyamine components. Examples of useful hydroxyl compounds include trihydric alcohol; β-hydroxy alkyl amides; polyols, especially those having molecular weights of less than 10,000; ethanol amines, such as triethanol amine; hydroxy alkyl urea; and oxazolidone. In one aspect, the polyol is a material containing two or more hydroxyl groups. Examples of polyols include but are not limited to glycerol, triethanolamine, pentaerythritol, hydroxy alkyl urea; oxazolidone, poly vinyl alcohol, polysaccharides like starches, guars and their derivatives, and combinations thereof. In another aspect the polyamine contains two or more amine groups. Examples of useful amines include triethanol amine, diethylene triamine, tetratethylene pentamine, polyethylene imine and combinations thereof.

According to the present invention, compounds capable of forming hydrogen-bonding complexes with copolymer polycarboxyl-functional binders allow for crosslinking at lower temperatures. These crosslinking compounds can be used in conjunction with the functional copolymers of the present invention. They also can be used with polymer and copolymers currently used as fiberglass binders. They can further also be used in combination with conventional crosslinking compounds. Examples of hydrogen-bonding complexing agents include polyalkylene glycol, polyvinyl pyrrolidone, polyethylene amine, or mixtures thereof. In one aspect, the polyalkylene glycol is polyethylene glycol.

The glass adhesion copolymer forms strong bonds without the need for a catalyst or accelerator. One advantage of not using a catalyst in the binder composition is that catalysts tend to produce films that can discolor and/or release phosphorous-containing vapors. Still, an accelerator or catalyst can be combined with the copolymer binder to decrease cure time, increase crosslinking density and/or decrease the water sensitivity of the cured binder. Useful catalysts include those known in the art, such as alkali metal salts of a phosphorous-containing organic acid, e.g., sodium hypophosphate, sodium phosphite, potassium phosphite, disodium pyrophosphate, tetra-sodium pyrophosphate, sodium tripolyphosphate, sodium hexametaphosphate, potassium polyphosphate, potassium tripolyphosphate, sodium trimetaphosphate, sodium tetrametaphosphate; fluouroborates, and mixtures thereof. Useful catalysts also include Lewis acids such as magnesium citrate or magnesium chloride, Lewis bases, or free radical generators such as peroxide. In one embodiment, the catalyst is present in the binder formulation in an amount of from about 0 to about 25 percent by weight based on the copolymer binder. In another embodiment, the catalyst is present in an amount of from about 1 to about 10 percent by weight based on the copolymer binder.

The present invention further relates to fiberglass binder or sizing compositions or formulations containing the copolymer binder described above. These fiberglass sizing compositions have excellent adhesion to the glass fibers. This good adhesion between fibers prevents the fibers from moving past each other and sagging over time.

One of the major problems encountered with current non-formaldehyde-based resin systems (herein referred to as conventional non-formaldehyde binder systems) is their lack of resistance to water and humidity. This lack of resistance results in sagging of the insulation in end use, which is detrimental to its insulating properties. While not being bound by theory, it is believed that the lack of water and humidity resistance is due, at least in part, to the presence of high amounts of inorganic salts in the system. Further, conventional polycarboxylates used in the binder system are extremely hydrophilic and tend to absorb large amounts of water and moisture.

The present invention overcomes this problem by use of a hydrophobic copolymer in a fiberglass sizing composition. This hydrophobic copolymer has at least one acid group and a hydrophobic comonomer. The polymer portion having at least one acid group is derived from at least one carboxylic monomer having the general formula (I)—

(I)

wherein $R^1$ to $R^4$ are independently hydrogen, methyl, carboxylic acid group, $CH_2COOH$, or alkyl or aryl sulfonic acids, and wherein the acid groups can be neutralized. This acid monomer includes acrylic acid, maleic acid, itaconic acid, 2-acrylamidomethyl propane sulfonic acid, styrene sulfonic acid, (meth)allyl sulfonic acid, (meth)allyloxybenzene sulfonic acid and combinations thereof.

The hydrophobic comonomer portion of the copolymer has the general formula (II)—

(II)

wherein $R^5$ is hydrogen, $C_1$-$C_6$ alkyl or $C_1$-$C_6$ hydroxyalkyl, and X is either mono or polycyclic aromatic group or a substituted aromatic group (with $R^5$ being hydrogen or methyl when X is aromatic) or X is of the general formula (III)—

(III)

wherein $R^6$ is (independently of $R^5$) hydrogen, $C_1$-$C_{24}$ alkyl, $C_1$-$C_{24}$ alkoxy, $C_1$-$C_{24}$ aminoalkyl, $C_1$-$C_{24}$ alkyl sulfonate, —O alkyl, —OCO alkyl, —NCO alkyl, carbocyclic, heterocyclic, or $C_1$-$C_{24}$ hydroxyalkyl; Y is O or N; and t is either 0 or 1. This hydrophobic comonomer constituent includes, for example, methacrylic acid, methyl (meth)acrylate, ethyl (meth)acrylate, t-butyl (meth) acrylate, methyl(meth) acrylamide, ethyl (meth) acrylamide, t-butyl (meth) acrylamide, vinyl acetate, vinyl pyrolidone, vinylpyridine, dimethylaminoethyl (meth)acrylate, diethylaminoethyl(meth)acrylate, t-butylaminoethyl(meth)acrylate, dimethyl aminopropyl (meth)acrylate, dimethyl aminoethyl (meth)acrylamide, diethyl aminoethyl(meth)acrylamide, t-butyl aminoethyl (meth)acrylamide, dimethyl aminopropyl (meth)acrylamide, poly(ethylene glycol) methacrylate, $C_{12-15}$ alcohol ethoxylated methacrylate, $C_{12-15}$ α-olefin, $C_{12-15}$ α-olefin sulfonate, styrene sulfonate, vinyl formamide, vinyl methylether, styrene, or α-methyl styrene. Combinations of these monomers are also included. The hydrophobic group can also be incorporated in to the polymer using a chain transfer agent. The chain transfer agent can be long chain alcohol or long chain thiol or mercaptan. The latter can incorporate hydrophobic thio alkyl groups in to the polymer.

In addition to the hydrophobic copolymer, the fiberglass sizing composition can include a crosslinker. The sizing composition can be formulated with a crosslinker typically used in fiberglass binder compositions, such as hydroxyl, polyol, or polyamine components. Examples of useful hydroxyl compounds include trihydric alcohol; β-hydroxy alkyl amides; polyols, especially those having molecular weights of less than 10,000; ethanol amines such as triethanol amine; hydroxy alkyl urea; and oxazolidone. In one aspect, the polyol is a material containing two or more hydroxyl groups. Examples of polyols include but are not limited to glycerol, triethanolamine, pentaerytlhritol, hydroxy alkyl urea; oxazolidone, poly vinyl alcohol, polysaccharides like starches, guars and their derivatives, and combinations thereof. In another aspect the polyamine contains two or more amine groups. Examples of useful amines include triethanol amine, diethylene triamine, tetratethylene pentamine, polyethylene imine and combinations thereof. The sizing formulation can optionally further include a catalyst or accelerator.

Alternatively, the lack of water and humidity resistance in conventional non-formaldehyde-based fiberglass binder systems can be overcome by adding a hydrophobic additive to the fiberglass binder composition. The hydrophobic additive can include any water repellant material. It can be a hydrophobic emulsion polymer such as styrene-acrylates, ethylene-vinyl acetate, poly siloxanes, fluorinated polymers and polyesters. The hydrophobic additive can also be a surfactant. The surfactant itself can provide hydrophobicity, or it can be used to deliver a hydrophobic water insoluble material. The surfactant can be non-ionic, anionic, cationic or amphoteric. In one aspect, the surfactants are nonionic and/or anionic. Nonionic surfactants include, for example, alcohol ethoxylates, ethoxylated polyamines and ethoxylated polysiloxanes. Anionic surfactants include alkyl carboxylates and alkylaryl sulfonates, α-olefin sulfonates and alkyl ether sulfonates.

The glass adhesion or hydrophobic copolymer, crosslinker and optional catalyst are blended together to form the fiberglass binder composition. This binder composition can optionally be further formulated with one or more adjuvants, for example, anti-oxidants/reducing agents, coupling agents, dyes, pigments, oils, fillers, thermal stabilizers, emulsifiers, curing agents, anti-migration aids, wetting agents, biocides, plasticizers, anti-foaming agents, waxes, flame-retarding agents, enzymes and lubricants. The adjuvants are generally added at levels of less than 20 percent based on the weight of the copolymer binder. The binder composition can also optionally include corrosion inhibitors. These corrosion inhibitors include tin compounds, for example, tin oxalate, thio ureas and acetylinic alcohols.

The fiberglass sizing composition can also be optionally formulated to include one or more additives for reducing leaching of glass. These additives include Zn compounds such as Zn carbonate and/or Zn sulfate. The additives can also include sodium silicate. In one aspect, these additives can reduce corrosion in metallic components.

The fiberglass sizing composition can further be optionally formulated to include one or more release additives. These release additives include silicone and fluorocarbon. The release additives can function in reducing static. They can also function in reducing resin buildup on equipment. In one aspect, the release additives are added to the fiberglass sizing composition. In another aspect, the release additives are applied onto a substrate either before or after applications of the fiberglass sizing composition onto the substrate.

As the pH of the fiberglass sizing composition is increased, the amount of neutralized carboxylate groups generated in the polymer is increased. Crosslinking is achieved if the acid group in the polymer is protonated. Crosslinking cannot be attained through any of the neutralized carboxylic groups, especially if the cation is monovalent. This increasing pH leads to lower crosslink density and degradation in physical properties. A lower pH can be achieved by using an organic acid such as malic, citric, salicylic, oxalic or tartaric acid, or an inorganic acid such as boric, sulfamic or sulfonic acid. Salts of boric acid can also be used. In one aspect, the pH of the fiberglass sizing composition is about 3.5 or less.

The present invention provides for an aqueous process for producing hydrophobic solution copolymers. According to this process, one or more acid functional monomers and one or more hydrophobic monomers are added to an aqueous solution. An initiating agent is added to the solution to effect polymerization of the monomers. Polymerization can occur at a temperature of about 90° C. or greater. With the polymerization of the monomers a hydrophobic solution copolymer is formed in the aqueous solution. The aqueous process can also include adding one or more chain transfer agents to the aqueous solution. In another aspect, the aqueous process can also include adding one or more allylic or disubstituted acid monomers to the aqueous solution. The allylic or disubstituted acid monomer can be maleic acid, sodium methallyl sulfonate, or combinations thereof. In one aspect, the aqueous process can also include adding one or more neutralizing agents to the aqueous solution.

The fiberglass binder composition is useful for bonding fibrous substrates to form a formaldehyde-free non-woven material. The fiberglass binder composition is especially useful as a binder for heat-resistant non-wovens such as aramid fibers, ceramic fibers, metal fibers, polyrayon fibers, polyester fibers, carbon fibers, polyimide fibers and mineral fibers such as glass fibers.

The copolymer binder composition is generally applied with a suitable spray applicator to a fiber glass mat as it is being formed so that the binder is distributed nearly evenly throughout the formed fiberglass mat. Typical solids are present in the aqueous solutions in amounts of about 5 to about 12 percent. The binder may also be applied by other means known in the art, including, but not limited to, airless spray, air spray, padding, saturating, and roll coating. The residual heat from the fibers causes water to be volatilized from the binder, and the high-solids binder-coated fiberglass mat is allowed to expand vertically due to the resiliency of the glass fibers.

The fiberglass mat is then heated to cure the binder. Typically, the curing oven operates at a temperature of from about 130° C. to about 325° C. When compounds that form hydrogen-bonding complexes with the copolymer binder are used, lower cure temperatures of about 110° C. to about 150° C. can be used. In one embodiment, the lower cure temperature is about 120° C. The fiberglass mat is typically cured in about 5 seconds to about 15 minutes. In another aspect, the mat is cured in about 30 seconds to about 3 minutes. Cure time depends on both the temperature and level of catalyst used.

After curing, the fiberglass mat can be compressed for shipping. An important property of the fiberglass mat is that it returns to its full vertical height once the compression is removed. The copolymer binder produces a flexible film that allows the fiberglass insulation to bounce back after the roll is unwrapped and placed in walls and/or ceilings.

Fiberglass and other non-woven materials treated with the copolymer binder composition are useful as heat and/or sound insulation in the form of rolls or batts; as a reinforcing mat for roofing and flooring products, ceiling tiles and flooring tiles; as a microglass-based substrate for printed circuit boards and battery separators; for filter stock and tape stock and for reinforcements in both non-cementatious and cementations masonry coatings.

The present invention also provides for a fiberglass sizing composition having a polymer having at least one acid group derived from at least one carboxylic acid monomer, one or more crosslinkers, and one or more additives. The acid-group containing polymer includes acrylic acid. In another aspect, the acid-group containing polymer is the glass adhesion copolymer described supra. In one aspect, the acid-group containing polymer is the copolymer described in formula (I) supra. In another aspect, the acid-group containing polymer is the copolymer described in formula (II) supra. The crosslinkers can include one or more polyols and/or polyamines. In one aspect, the polyol contains 2 or more hydroxyl groups. Exemplary polyols include glycerol, triethanolamine, pentaerythritol, hydroxy alkyl urea, oxazolidone, polyvinyl alcohol, polysaccharide-like starches, guars and their derivatives, or combinations thereof. In another aspect the polyamine contains 2 or more amine groups. Exemplary polyamines include triethanol amine, diethylene triamine, tetratethylene pentamine, and polyethylene imine or combinations thereof.

The one or more additives of this three constituent fiberglass sizing composition includes corrosion inhibitors, hydrophobic additives, additives for reducing leaching of glass, release agents, acids for lowering pH or combinations thereof. In one aspect the one or more additives is at least one or more corrosion inhibitors. These corrosion inhibitors include tin compounds such as tin oxalate, thio ureas, acetylinic alcohols and combinations thereof.

In another aspect the one or more additives is at least one or more hydrophobic additives. These hydrophobic additives can include a water repellant material. In another aspect, the hydrophobic additives can include a hydrophobic emulsion polymer. The hydrophobic emulsion polymer can be, for example, styrene-acrylates, ethylene-vinyl acetate, poly siloxanes, fluorinated polymers, polyesters or combinations thereof. In another aspect the one or more hydrophobic additives can include one or more surfactants. These surfactants can provide hydrophobicity to the composition. At least one of the surfactants can deliver a hydrophobic water insoluble material. In one aspect the surfactant is nonionic, anionic, cationic or amphoteric. In another aspect the surfactant is nonionic or anionic. Examples of the nonionic surfactant include alcohol ethoxylates, ethoxylated polyamines, ethoxylated polysiloxanes or combinations thereof. Examples of the anionic surfactant include alkyl carboxylates and alkylaryl sulfonates, α-olefin sulfonates, alkylether sulfonates or combinations thereof.

In one embodiment, the one or more additives of the three constituent fiberglass sizing composition include at least one or more additives for reducing leaching of glass. These leaching reduction additives can include Zn compounds. Examples of such Zn compounds include Zn carbonate and/or Zn sulfate. These one or more leaching reduction additives can also include sodium silicate. In one aspect, these leaching reduction additives can reduce corrosion in metallic components.

In another embodiment, the one or more additives of the three constituent fiberglass sizing composition include at least one or more release additives. These release additives can function in reducing static. The release additives can also function in reducing buildup of the resin on equipment. Examples of release additives include silicone or fluorocarbon.

The following examples are presented to further illustrate and explain the present invention and should not be taken as limiting in any regard.

COPOLYMER COMPOSITIONS

Example 1

A reactor containing 200 grams of water and 244 grams of isopropanol ($C_3H_8O$) was heated to 85° C. A monomer solution containing 295 grams of acrylic acid ($C_3H_4O_2$) and 4.1 grams of N,N-dimethyl acrylamide was added to the reactor over a period of 3.0 hours. An initiator solution containing 15 grams of sodium persulfate ($Na_2S_2O_8$) in 100 grams of deionized water was simultaneously added to the reactor over a period of 3.5 hours. The reaction product was held at 85° C. for an additional hour. The isopropanol was then distilled using a Dean-Stark trap.

Example 2

A reactor containing 200 grams of water and 244 grams of isopropanol was heated to 85° C. A monomer solution containing 295 grams of acrylic acid and 5 grams of vinyl tri-isopropoxy silane (available as Coat O Sil® 1706 from GE Silicones, Wilton, Conn.) was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. The isopropoxy silane attaches to the copolymer via the vinyl linkage. However, it hydrolyzes during the reaction to form silanol groups and isopropanol. The isopropanol formed is distilled with the rest of the isopropanol added to the initial charge. Additional water is added to the reaction to dilute it to 50% solids.

Example 3

A reactor containing 200 grams of water and 244 grams of isopropanol was heated to 85° C. A monomer solution containing 295 grams of acrylic acid and 5 grams of vinyl triethoxy silane (available as Silquest® A-151 Silane from GE Silicones, Wilton, Conn.) was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. The vinyl triethoxy silane attaches to the copolymer via the vinyl linkage. However, it hydrolyzes during this reaction to form silanol groups and ethanol. The ethanol formed is distilled with the rest of the isopropanol added to the initial charge. Additional water is added to the reaction to dilute it to 50 percent solids.

Example 4

A reactor containing 200 grams of water and 244 grams of isopropanol was heated to 85° C. A monomer solution containing 295 grams of acrylic acid and 5 grams of 4-vinylpyridine was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was distilled using a Dean-Stark trap. The vinyl pyridine moiety was then oxidized to amine oxide by treating the polymer with hydrogen peroxide in the presence of sodium molybdate ($Na_2MoO_4.2H_2O$).

Example 5

The test procedure for adhesion to glass is as follows. A 10 percent polymer solution is sprayed onto glass microscope slides. A polymer film forms on each slide with evaporation of the water from the solution. The glass slides are weighed before and after the films are developed. The slides are then soaked in a 1.0% NaOH solution for 10 minutes and then dried. The effectiveness of the adhesion to glass can be measured either by the amount of polymer still on the glass slides, or by analyzing the amount of polymer redissolved in the 1.0% NaOH solution.

TABLE 1

| Example | Polymer sample | Polymer description | Adhesion to glass |
|---|---|---|---|
| 5a | Alcosperse 602A (from Alco Chemical) | Homopolymer of acrylic acid | none |
| 5b | Example 1 | Copolymer of acrylic acid and N,N dimethylacrylamide | good |
| 5c | Example 2 | Copolymer of acrylic acid and vinyl tris silanol | Excellent |
| 5d | Example 3 | Copolymer of acrylic acid and vinyl tris silanol | Excellent |
| 5e | Example 4 | Copolymer of acrylic acid 4-vinylpyridine-N-oxide | Excellent |

Example 6

A reactor containing 300 grams of water and 244 grams of isopropanol was heated to 85° C. A monomer solution containing 295 grams of acrylic acid and 40 grams of methyl methacrylate and 4 grams of vinyl methoxy silane was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. The vinyl methoxy silane is attached to the copolymer via the vinyl linkage. However, it hydrolyzes during the reaction to form silanol groups and methanol.

The methanol formed is distilled with the isopropanol added to the initial charge. Additional water is added to the reaction to dilute it to 50% solids.

Example 7

A reactor containing 300 grams of water and 244 grams of isopropanol was heated to 85° C. A monomer solution containing 295 grams of acrylic acid and 60 grams of methyl methacrylate was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. Additional water is added to the reaction to dilute it to 50% solids.

Example 8

A reactor containing 300 grams of water and 244 grams of isopropanol was heated to 85° C. A monomer solution containing 295 grams of acrylic acid and 20 grams of styrene and 4 grams of vinyl ethoxy silane was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. The vinyl ethoxy silane is attached to the copolymer via the vinyl linkage. However, it hydrolyzes during the reaction to form silanol groups and ethanol. The ethanol formed is distilled with the isopropanol added to the initial charge. Additional water is added to the reaction to dilute it to 50% solids.

Example 9

A reactor containing 300 grams of water and 244 grams of isopropanol was heated to 85° C. A monomer solution containing 295 grams of acrylic acid and 30 grams of styrene was added to the reactor over a period of 3.0 hours. An initiator solution comprising of 15 grams of sodium persulfate in 100 grams of deionized water was simultaneously added to the reactor over a period of 3.5 hours. The reaction product was held at 85° C. for an additional hour. The isopropanol was then distilled using a Dean-Stark trap. Additional water is added to the reaction to dilute it to 50% solids.

Example 10

Aqueous Process for Producing a Hydrophobically Modified Copolymer 300 g of water, 42 grams of maleic anhydride and 0.025 grams of ferrous ammonium sulfate hexahydrate was heated in a reactor to 95° C. A mixture of 280 g of acrylic acid and 23.7 g of styrene were added to the reactor over a period of four hours. At the same time, a solution of 12.0 g of sodium persulfate, 75 grams of 35% hydrogen peroxide solution in 100 g of water was added to the reactor over a period of 4.5 hours. The temperature of the reactor was maintained at 95° C. for two hours, after which a clear light yellow solution of the polymer was obtained.

FIBERGLASS SIZING FORMULATION EXAMPLES

Example 11

Fiberglass Sizing Composition Having Hydrophobic Copolymer

| Ingredients | Wt % |
| --- | --- |
| Polymer of Example 7 | 20 |
| Triethanol amine | 5 |
| Water | 75 |

Example 12

Fiberglass Sizing Composition Having Hydrophobic Copolymer with a Glass Adhesion Moiety

| Ingredients | Wt % |
| --- | --- |
| Polymer of Example 6 | 20 |
| Glycerol | 4 |
| Water | 76 |

Example 13

Fiberglass Sizing Composition Having a Surfactant as a Hydrophobic Additive

| Ingredients | Wt % |
| --- | --- |
| Polymer of Example 9 | 20 |
| Triethanolamine | 5 |
| $C_{12-15}$ alcohol with 7 moles of ethoxylation (surfactant) | 10 |
| Water | 65 |

Example 14

Fiberglass Sizing Composition Having Hydrophobic Copolymer with a Glass Adhesion Moiety and a Corrosion Inhibitor

| Ingredients | Wt % |
| --- | --- |
| Polymer of Example 6 | 20 |
| Glycerol | 4 |
| Tin oxalate (corrosion inhibitor) | 1 |
| Water | 76 |

Example 15

Fiberglass Sizing Composition Having Hydrophobic Copolymer

| Ingredients | Wt % |
| --- | --- |
| Polymer of Example 7 | 20 |
| Triethanol amine | 5 |
| Tartaric acid (to lower pH) | 10 |
| Water | 65 |

Example 16

Fiberglass Sizing Composition Having Acrylic Acid Homopolymer and Hydrophobic Copolymer as an Additive

| Ingredients | Wt % |
| --- | --- |
| Polymer of Example 7 | 2 |
| Starch | 5 |
| Homopolymer of acrylic acid (available as Alcosperse ® 602A from Alco Chemical, Chattanooga, TN) | 20 |
| Water | 73 |

Example 17

Fiberglass Sizing Composition Having Acrylic Acid Homopolymer and Hydrophobic Emulsion Copolymer as an Additive

| Ingredient | Wt % |
| --- | --- |
| Ethylene vinyl acetate copolymer (available as Resyn ® 1971 from Vinamul Polymers, Enoree, SC) | 2 |
| Glycerol | 5 |
| Homopolymer of acrylic acid (available as Alcosperse ® 602A from Alco Chemical, Chattanooga, TN) | 20 |
| Water | 73 |

Example 18

Fiberglass Sizing Composition Having Acrylic Acid Homopolymer and Hydrophobic Emulsion Copolymer as an Additive

| Ingredient | Wt % |
| --- | --- |
| Organosilicone (available as Dow Corning ® 2-9034 from Dow Corning, Midland, MI) | 2 |
| Glycerol | 5 |
| Homopolymer of acrylic acid (available as Aquatreat ® 900A from Alco Chemical, Chattanooga, TN) | 20 |
| Water | 73 |

Example 19

Fiberglass Sizing Composition Having Acrylic Acid Homopolymer and Hydrophobic Copolymer as an Additive

| Ingredient | Wt % |
| --- | --- |
| Sodium methyl silconate (available as Dow Corning ® 772 from Dow Corning, Midland, MI) | 1 |
| Triethanol amine | 8 |
| Homopolymer of acrylic acid (available as Alcosperse ® 602A from Alco Chemical, Chattanooga, TN) | 20 |
| Water | 71 |

Example 20

Fiberglass Sizing Composition Having Acrylic Acid Homopolymer and Hydrophobic Emulsion Copolymer as an Additive

| Ingredient | Wt % |
| --- | --- |
| Styrene-acrylate emulsion (available as RAP 810NA from The Dow Chemical Company, Midland, MI) | 5 |
| Glycerol | 8 |
| Homopolymer of acrylic acid (available as Aquatreat ® 900A from Alco Chemical, Chattanooga, TN) | 18 |
| Water | 68 |

Example 21

Fiberglass Sizing Composition Having an Anionic Surfactant as a Hydrophobic Additive

| Ingredient | Wt % |
| --- | --- |
| Polymer of Example 9 | 20 |
| Triethanol amine | 5 |
| $C_{12-15}$ alcohol with 3 moles of ethoxylation sulfate (surfactant) | 10 |
| Water | 65 |

Example 22

Fiberglass Sizing Composition Having Hydrophobic Emulsion Copolymer

| Ingredient | Wt % |
| --- | --- |
| Styrene-acrylate emulsion (available as Joncryl ® 90 from Johnson Polymer, Sturtevant, WI) | 20 |
| Glycerol | 8 |
| Water | 72 |

Example 23

Fiberglass Sizing Composition Having Acrylic Acid Homopolymer and Hydrophobic Emulsion Copolymer as an Additive

| Ingredient | Wt % |
| --- | --- |
| Methacrylic acid-ethylacrylate copolymer (available as Alcogum ® L15 from Alco Chemical, Chattanooga, TN) | 5 |
| Glycerol | 8 |
| Homopolymer of acrylic acid (available as Aquatreat ® 900A from Alco Chemical, Chattanooga, TN) | 18 |
| Water | 68 |

Example 24

Molecular modeling was used to calculate solubility parameters of a copolymer of acrylic acid and co-styrene (7.5 mole %). The solubility parameter provided in Table 2 below gives an estimate of the water solubility of the copolymer.

TABLE 2

| Material | pH | Mole % Na acrylate | Solubility parameter $(Joules/cc)^{1/2}$ |
| --- | --- | --- | --- |
| Acrylic acid - co-styrene (7.5 mole %) | 3 | 5 | 27.63 |
| Acrylic acid - co-styrene (7.5 mole %) | 4 | 33 | 43.13 |
| Poly(acrylic acid) | 4 | 0 | 46.2 |
| Polystyrene | — | — | 20.1 |
| Water | — | — | 47.96 |

The data indicates that polyacrylic acid is very water soluble since its solubility parameter is close to that of water. The data indicate that the styrene copolymer with acrylic acid is less water soluble. In fact, at pH 3 it is extremely hydrophobic since its solubility parameter is close to that of polystyrene which is insoluble in water. Therefore, fiberglass sized using an acrylic acid-styrene copolymer will be very water repellant.

Example 25

Molecular modeling was used to calculate solubility parameters of various copolymers of acrylic acid at pH 3. The copolymers modeled and their associated solubility parameters are provided below in Table 3—

TABLE 3

| Copolymer | Mole % comonomer | Solubility parameter $(Joules/cc)^{1/2}$ |
| --- | --- | --- |
| Water | — | 48 |
| Acrylic acid - methacrylic acid | 30 | 35 |
| Acrylic acid - methyl methacrylate | 10 | 30 |
| Acrylic acid - styrene | 7.5 | 28 |
| Polystyrene | — | 20 |

The data indicates that acrylic acid copolymers with styrene, methyl methacrylate and methacrylic acid are very hydrophobic.

Example 26

Hydrophobic Properties of Acrylic Acid Methyl Methacrylate Copolymer Compared to Homopolymer of Acrylic Acid

TABLE 4

| | Solution A (grams) | Solution B (grams) |
| --- | --- | --- |
| Polymer of Example 6 (Copolymer of acrylic acid and methyl methacrylate) | 20 | — |
| Homopolymer of acrylic acid | — | 20 |
| Sodium hypophosphite | — | 3 |
| Triethanol amine | 7 | 7 |
| Water | 73 | 73 |

The solutions detailed in Table 4 above were prepared. Solutions A and B were sprayed on to fiber glass mats. The mats were cured in an oven at 200° C. for 2 minutes. These mats were then put in to humidity chamber at 40° C. and 90% humidity for 1 hour. The moisture uptake after an hour was measured as the percent weight gain of the mat, provided in Table 5 below.

TABLE 5

| Solution | Polymer | % moisture uptake |
| --- | --- | --- |
| A | Polymer of Example 6 (Copolymer of acrylic acid and methyl methacrylate) | 40 |
| B | Homopolymer of acrylic acid catalyzed with sodium hypophosphite | 60 |

The data indicate that hydrophobic copolymers of this invention absorb far less moisture than a homopolymer of acrylic acid catalyzed using sodium hypophosphite. This can be attributed to the fact that the inorganic material generated from sodium hypophosphite will absorb moisture and have a negative impact on the fiber glass mat properties.

Example 27

Fiberglass Sizing Composition Having a Surfactant as a Release Agent

| Ingredient | Wt % |
|---|---|
| Polymer of Example 9 | 20 |
| Triethanolamine | 5 |
| Dioctylester of sodium sulfosuccinic acid (available as Aerosol ® OT 100 from Cytec Industries, West Paterson, NJ) | 1 |
| Water | 74 |

Example 28

Fiberglass Sizing Composition Having a Silicone as a Release Agent

| Ingredient | Wt % |
|---|---|
| Polymer of Example 9 | 20 |
| Triethanolamine | 5 |
| Silicone emulsion of a 350 cs dimethyl polysiloxane fluid (available as SWS-231 from Wacker Chemical Corp., Adrian, MI) | 1 |
| Water | 74 |

Example 29

Fiberglass Sizing Composition Having an Additive to Minimize Glass Leaching

| Ingredient | Wt % |
|---|---|
| Polymer of Example 9 | 20 |
| Triethanolamine | 5 |
| ZnCO$_3$ | 2 |
| Water | 73 |

Example 30

Fiberglass Sizing Composition Having an Acid for pH Control

| Ingredient | Wt % |
|---|---|
| Polymer of Example 9 | 20 |
| Triethanolamine | 5 |
| Boric acid | 2 |
| Water | 73 |

Example 31

Fiberglass Sizing Composition Having an Acid Corrosion Inhibitor

| Ingredient | Wt % |
|---|---|
| Polymer of Example 8 | 20 |
| Triethanolamine | 5 |
| Borate ester corrosion inhibitor (available as Monacor BE from Uniqema, Paterson, NJ) | 1 |
| Water | 74 |

Example 32

Fiberglass Sizing Composition Having an Acid Corrosion Inhibitor/Prevention of Glass Leaching Agent

| Ingredient | Wt % |
|---|---|
| Polymer of Example 7 | 20 |
| Triethanolamine | 5 |
| Sodium Silicate (SiO$_2$/Na$_2$O) (available as N ® Sodium Silicate from the PQ Corporation, Berwyn, PA) | 1 |
| Water | 74 |

Although the present invention has been described in detail, it is to be clearly understood that the same is by way of illustration and example only, and is not to be taken as a limitation. The spirit and scope of the present invention are to be limited only by the terms of any claims presented hereafter.

What is claimed is:

1. A glass binding composition comprising a copolymer derived from a monomer mixture comprising:
    about 30 to about 99.99 percent by weight of at least one acid functional monomer unit selected from the group consisting of acrylic acid, methacrylic acid, maleic acid, 2-acrylamidomethyl propane sulfonic acid, styrene sulfonic acid, (meth)allyl sulfonic acid, (meth)allyloxybenzene sulfonic acid or mixtures thereof;
    about 0.01 to about 30 percent by weight of at least one silanol monomer as a comonomer unit; and
    about 0 to about 50 percent by weight of at least one ethylenically unsaturated monomer unit,
    wherein the copolymer is soluble in water; and a crosslinker.

2. The glass binding composition of claim 1 wherein the copolymer has a molecular weight of from about 1,000 to about 300,000.

3. The glass binding composition of claim 1 wherein the at least one silanol monomer is selected from the group consisting of vinyl trisisopropoxy silane, vinyl trisethoxy silane, vinyl trismethoxy silane, vinyl tri(2-methoxyethoxy) silane, vinyl methyl dimethoxy silane, γ-methacryl oxypropyl trimethoxy silane, and vinyl triacetoxy silane.

4. The glass binding composition of claim 1 wherein the at least one silanol monomer is selected from the group consisting of vinyl trisisopropoxy silane, vinyl trisethoxy silane, vinyl trismethoxy silane, vinyl tri(2-methoxyethoxy) silane, vinyl methyl dimethoxy silane, and vinyl triacetoxy silane.

5. The glass binding composition of claim 1 wherein the copolymer comprises about 6.27 percent to about 50 percent by weight of at least one ethylenically unsaturated monomer unit.

6. The glass binding composition of claim 1, further comprising a catalyst and/or accelerator.

7. The glass binding composition of claim 1, further comprising a corrosion inhibitor.

* * * * *

UNITED STATES PATENT AND TRADEMARK OFFICE
CERTIFICATE OF CORRECTION

| | | |
|---|---|---|
| PATENT NO. | : 7,776,985 B2 | Page 1 of 1 |
| APPLICATION NO. | : 11/852435 | |
| DATED | : August 17, 2010 | |
| INVENTOR(S) | : Klin A. Rodrigues and James C. Long | |

It is certified that error appears in the above-identified patent and that said Letters Patent is hereby corrected as shown below:

Col. 20, line 55, Claim 1     add after crosslinker "includes one or more polyols and/or a polyamine selected from the group consisting of a triethanol amine, a diethylene triamine, a tetraethylene pentamine, a polyethylene imine and combinations thereof."

Signed and Sealed this

Nineteenth Day of April, 2011

David J. Kappos
*Director of the United States Patent and Trademark Office*